United States Patent [19]
Evans et al.

[11] Patent Number: 5,882,476
[45] Date of Patent: Mar. 16, 1999

[54] DEINKING PRINTED WASTEPAPER USING ALKALINE SOLUTION CONTAINING SODIUM SULFITE AND SODIUM CARBONATE

[75] Inventors: Emmett J. Evans, Fairhope, Ala.; Stuart G. Guthrie, Houston, Tex.

[73] Assignee: Solvay Minerals, Inc., Houston, Tex.

[21] Appl. No.: 435,169

[22] Filed: May 5, 1995

[51] Int. Cl.[6] .................................................. D21C 5/02
[52] U.S. Cl. ........................................ 162/7; 162/2
[58] Field of Search ........................................ 162/4, 8, 7

[56] References Cited

U.S. PATENT DOCUMENTS

| | | |
|---|---|---|
| 936,106 | 10/1909 | Finkelstein . |
| 1,060,158 | 4/1913 | Burby . |
| 1,112,887 | 10/1914 | Burby . |
| 1,298,779 | 4/1919 | Osborne . |
| 1,327,590 | 1/1920 | Burby . |
| 1,572,478 | 2/1926 | Hammond . |
| 1,791,445 | 2/1931 | Grenaudier . |
| 1,859,845 | 5/1932 | Rue et al. . |
| 1,859,846 | 5/1932 | Rue et al. . |
| 1,919,140 | 7/1933 | Weber et al. . |
| 1,929,145 | 10/1933 | Lenher et al. ................................ 92/14 |
| 1,962,164 | 6/1934 | Wells ........................................... 92/11 |
| 1,991,823 | 2/1935 | Snyder .......................................... 92/9 |
| 2,072,487 | 3/1937 | Snyder .......................................... 92/9 |
| 3,003,909 | 10/1961 | Olson ........................................ 162/36 |
| 3,262,839 | 7/1966 | Luthgens ................................... 162/83 |
| 3,576,710 | 4/1971 | Mader et al. .............................. 162/79 |
| 3,865,684 | 2/1975 | Gleason et al. ............................. 162/4 |
| 3,986,922 | 10/1976 | Parker et al. ................................ 162/5 |
| 3,998,688 | 12/1976 | Fischer et al. ............................. 162/50 |
| 4,013,505 | 3/1977 | Balcar et al. ............................... 162/5 |
| 4,213,821 | 7/1980 | Vanderhoek et al. ..................... 162/72 |
| 4,390,395 | 6/1983 | De Ceuster et al. ........................ 162/5 |
| 4,411,737 | 10/1983 | Galeano ....................................... 162/7 |
| 4,561,933 | 12/1985 | Wood et al. ................................. 162/5 |
| 4,780,179 | 10/1988 | Clement ...................................... 162/5 |
| 4,810,328 | 3/1989 | Freis et al. ................................. 162/60 |
| 4,902,382 | 2/1990 | Sakabe et al. ........................... 162/125 |
| 5,039,377 | 8/1991 | von Raven et al. ....................... 162/78 |
| 5,069,816 | 12/1991 | De Santis et al. .................... 252/315.5 |
| 5,133,833 | 7/1992 | Weber et al. ................................ 162/8 |
| 5,139,617 | 8/1992 | Tikka et al. ............................... 162/72 |
| 5,147,503 | 9/1992 | Nguyen ....................................... 162/7 |
| 5,213,661 | 5/1993 | Naddeo et al. .............................. 162/6 |
| 5,225,046 | 7/1993 | Borchardt ................................... 162/5 |
| 5,234,545 | 8/1993 | Fabry et al. ................................ 162/7 |
| 5,316,621 | 5/1994 | Kitao et al. ................................. 162/4 |
| 5,324,390 | 6/1994 | Naddeo et al. .............................. 162/6 |
| 5,332,471 | 7/1994 | Naddeo et al. .............................. 162/6 |
| 5,332,474 | 7/1994 | Maxham ................................. 162/189 |
| 5,338,402 | 8/1994 | Devic et al. ............................. 162/24 |
| 5,360,512 | 11/1994 | Blum .......................................... 162/8 |
| 5,391,261 | 2/1995 | Van En Bergh ............................ 162/4 |
| 5,429,716 | 7/1995 | Hache et al. ................................ 162/7 |
| 5,449,436 | 9/1995 | Bourson et al. ............................ 162/6 |

FOREIGN PATENT DOCUMENTS 719622   10/1965   Canada .

OTHER PUBLICATIONS

Woodward "Appropriate Chem . . . Deinking Operations" Deinking Tech, Paper Recycling by Ken Patrick, 1991, pp. 154–158.

*Primary Examiner*—Stanley S. Silverman
*Assistant Examiner*—Dean T. Nguyen
*Attorney, Agent, or Firm*—Brinks Hofer Gilson & Lione

[57] ABSTRACT

This invention is a method for deinking wastepaper by disintegrating the waste paper in an carbonate aqueous solution containing sodium sulfite and sodium carbonate to produce a fibrous slurry having a pH of at least 7.5, separating the ink from the fibers and removing the ink from the slurry. A composition useful for deinking fiber consists of a relative proportion of sodium sulfite to sodium carbonate between about 95:5 and about 50:50, and a surfactant.

15 Claims, No Drawings

DEINKING PRINTED WASTEPAPER USING ALKALINE SOLUTION CONTAINING SODIUM SULFITE AND SODIUM CARBONATE

BACKGROUND

The invention relates to a method for deinking printed wastepaper, and the use of a deinking agent, to produce a recycled pulp that can be processed into paper products.

Wastepaper has long served as a source of raw material for use in papermaking, but typically, recycled wastepaper is used for making low grade paper and paperboard products. Today, as consumers have become more ecologically conscious, the demand for recycled content in higher-quality paper has increased. Because of its quantity, waste newsprint is a particularly important feedstock. It is necessary to remove the ink from these printed wastepapers so that it can be used in high quality products.

In a conventional wastepaper reclamation process, deinking methods include disintegrating the wastepaper, or "furnish", into a pulp or slurry in an aqueous alkaline deinking solution containing deinking agents, washing and then bleaching the pulp. Physical agitation of the paper fibers causes some ink separation. Caustic soda is usually used to provide the alkalinity needed to promote fiber swelling that results in the remaining ink to separate from the paper fibers. Surfactant is added to prevent the ink from reattaching to the fibers. The surfactant also acts as a foaming agent to carry off the ink when the fibers are washed in flotation cells. Hydrogen peroxide or other bleaching agents are added to whiten and brighten the pulp to the appropriate end-use requirements. Metal silicates are added to stabilize the bleaching agents.

The caustic soda and bleaching agents can have deleterious effects on the paper fibers. At the high pH levels needed for caustic soda to promote ink-fiber separation, the strong alkalinity can embrittle the fibers and cause alkaline darkening. Although the bleaching agents counteract the darkening, these agents can further weaken the fibers.

Therefore, there is a need for a wastepaper deinking process that reduces the amount of chemicals required, simplifies the process, and achieves brighter and more flexible fibers.

SUMMARY OF THE INVENTION

The present invention provides a method of deinking recycled fibers by disintegrating waste paper in an alkaline aqueous solution containing sodium sulfite and sodium carbonate to produce a fibrous slurry having a Ph of at least about 7.5, separating ink from the fibers and removing the ink from the slurry. This process advantageously provides the alkalinity needed to separate the ink without embrittling or darkening the fibers.

In another embodiment, there is provided a composition used to promote ink-fiber separation consisting of sodium sulfite and sodium carbonate in a ratio between about 95:5 and 50:50, and a surfactant. The use of this invention may produce recycled pulp of desired brightness so that additional bleaching is eliminated completely or greatly reduced. Further advantages and benefits will be apparent from the detailed description of the invention.

DETAILED DESCRIPTION OF THE PRESENTLY PREFERRED EMBODIMENTS

The present invention includes a wastepaper deinking process in which the wastepaper charge is disintegrated in an alkaline aqueous solution containing sodium sulfite and sodium carbonate, and preferably, surfactant, to produce a fibrous slurry. These chemicals separate the ink from the wastepaper fibers and keep the ink from reattaching to the fibers. The slurry is then washed by screen washing, or flotation, to remove the ink from the slurry. The pulp in the slurry has good properties, such as freeness and brightness, so that it can then be pressed into a paper or used as a raw material for the other high quality paper products.

The invention is applicable to the deinking of common wastepaper stocks, such as newsprint, book, ledger, magazine, xerographic paper and mixed office waste. The wastepaper charge to the process is also known as the "furnish". The chemical requirements of the process can vary depending on the furnish. As different papers are made from different processes, such as the acid-sulfite process, the kraft process, the groundwood process, the chemithermomechanical process, etc., the wastepaper furnish exhibits different characteristics depending on the combination of papers used to make up the furnish.

Moreover, even the character of homogenous furnishes can vary depending on the original source of the paper. For example, newsprint made from Southern softwoods by one paper process can result in much different furnish characteristics than newsprint made from Pacific Northwest softwoods. Thus, the optimum amount of chemicals and the optimum combination and proportion of chemicals required by the process may vary depending upon the furnish used when practicing this invention. However, the optimum amount of chemicals may be readily determined by one skilled in the art without undue experimentation.

The process, according to this invention, is carried out by placing the furnish in a disintegrator with water and the deinking agent. The disintegrator physically reduces the furnish into individual fibers. This step can be accomplished using any of the various conventional equipment designed for this purpose. For example, either a disintegrator or a hydrapulper may be used. This equipment reduces the furnish and contents into a pulp or a fibrous slurry. It is preferred that the furnish be disintegrated in an alkaline environment so that the deinking agents and mechanical stress cooperate to most effectively separate the ink from the fibers. However, it is possible to carry out the invention by first producing a slurry and then adding the deinking chemicals.

Depending upon the furnish used and the slurry product requirements, sufficient sodium sulfite and sodium carbonate should be used to achieve a pH in the slurry between about 7.5 and 10.5. It is believed that the pH of the slurry after the furnish has been disintegrated is important to control. Therefore, an acidic furnish will require more sodium sulfite and sodium carbonate to obtain the desired end pH, then will an alkaline furnish. Preferably, sufficient deinking agent is used to achieve a slurry pH between about 8 and about 10, more preferably, between about 9 and about 10.

Typically, the invention will require sodium sulfite and sodium carbonate in a total quantity between about 0.5 percent by weight and about 12 percent by weight, calculated as a percent of the dry weight of the furnish. For example, in deinking waste newsprint sourced from the southeast United States, by adding a total quantity of sodium sulfite and sodium carbonate between about 1% and about 7.5% by weight of dry furnish, a pH between about 9 and about 10 can be achieved in a slurry with a 3% consistency. The proportion of sodium sulfite is preferably about 70% to about 30% sodium carbonate for this example. Thus, between about 0.7% and about 5.0% sodium sulfite and between about 0.3% and about 2.5% sodium carbonate may be used. Preferably, between about 2.1% and about 5.0% sodium sulfite and between about 0.9% and about 2.5% sodium carbonate is used. A pH of about 9.5 may be achieved by using about 3.5% sodium sulfite and about 1.5% sodium carbonate by weight of dry furnish in a slurry with 3% consistency.

In practice, wastepaper may be deinked by preparing a slurry with a consistency between about 3% and about 15%. By consistency, it should be understood to mean the weight of the dry furnish over the total weight of the slurry. This consistency is based on the slurry condition during disintegration and before it is diluted for washing and removal of the separated ink.

The optimal pH and optimal amount of sodium sulfite and sodium carbonate will vary depending on the consistency of the slurry. Generally, it is believed that the desirable slurry pH will decrease with higher consistencies. As well, because the sodium sulfite and sodium carbonate are measured on the basis of the dry weight of the furnish, lower amounts on this basis will be needed to obtain the same aqueous concentrations with higher consistency slurries. Correspondingly, lower amounts of sodium sulfite and sodium carbonate, on the basis of the dry weight of the furnish, will be needed to obtain the same or lower pH with higher consistency slurries. Even though there is likely no direct linear correlation, a person having ordinary skill in the art may readily determine the optimal pH and amount of deinking agent required from the foregoing without undue experimentation.

The invention may be carried out using a composition for wastepaper deinking that includes relative proportions of between about 50–95% sodium sulfite and about 5–50% sodium carbonate. Also, the deinking agent may include up to an equal amount of surfactant. Preferably, the deinking composition contains relative proportions of between about 60–80% sodium sulfite, and between about 20–40% sodium carbonate. More preferably, the deinking composition contains relative proportions of about 70% sodium sulfite and about 30% sodium carbonate. Preferably, surfactant may be added in a ratio to the combined sodium sulfite and sodium carbonate between about 1:1 and about 1:1000. More preferably, the relative ratio of surfactant may be on the order of magnitude between about 1:10 and about 1:100.

Because of the superior results that this invention achieves, it will eliminate or greatly reduce the need for additional bleaching. Thus, the need for additional bleaching agents, stabilizers, etc., with the deinking composition are completely eliminated or greatly reduced. Of course, the optimal composition will vary depending upon the intended slurry operating conditions and furnish characteristics, among other factors, such as whether increased slurry freeness or brightness is more desirable.

Generally, the processing of the slurry can be carried out at temperatures between about 20° C. and about 100° C. The invention has been found to be particularly effective at a temperature between about 30° C. and 75° C., and it is more preferred to operate at the middle of this range.

The contact time for the deinking composition and wastepaper furnish is not critical for the purposes of this invention. A contact time greater than about 5 minutes is preferred from the standpoint of deinking performance. It is believed that a contact time in the range from about 15 minutes to about 45 minutes will provide most efficient deinking performances. This, of course, depends on the size of the equipment used, the volumes and the throughput desired.

Following the prescribed contact time period, the separated ink is removed from the slurry. Typically, flotation methods may be used whereby a stream of air or other gas is bubbled through the slurry. The bubbles rise to the surface and carry the ink particles with them and generating a foam that traps the ink particles. The foam is then skimmed off. Use of a surfactant, either as part of the deinking agent, or as a separate additive, is required for flotation methods. Any surfactant suitable for operation under alkaline conditions, as well known by one skilled in the art, may be used with the invention.

Alternatively, washing methods may be used to remove the separated ink particles from the fibrous slurry. Any number of commercially practiced washing methods would be suitable for this purpose.

EXAMPLES

A furnish was made up of 100% waste newsprint sourced from the southeast United States. The furnish was disintegrated in a Standard British Disintegrator using 33 air-dried grams of newsprint in 1 liter of tap water at about 55° C. Sodium sulfite and/or sodium carbonate was added to the Disintegrator in the amounts as shown in Table 1 calculated as a percent of the dry wastepaper charge. Sodium hydroxide was used as a benchmark control. The Disintegrator was then run for 15 minutes. The pH of the resulting slurry was measured at the end of the disintegration run. The temperature, generally, decreased to about 40° C. at the end of the disintegration run.

The slurry was transferred to the vat of a benchtop flotation cell (Wemco Model 71260-01, 2 liter, Agitator Laboratory Flotation Machine) and diluted to a total 3 liters volume with tap water at 55° C. The flotation cell agitator was started at 900 r.p.m. and 2 ml of a surfactant was added (DI-600, from Kao Chemicals) equivalent to 0.35% by weight dry wastepaper charge. Air flow of 10 liters/min. was introduced into the slurry and continued for 10 minutes while the foam overflow was captured in a side-mounted bucket.

A sample of the deinked slurry was taken and tested for consistency and Canadian Standard Freeness. Standard handsheets were made from the remaining slurry, conditioned overnight and tested for various properties including brightness and strength. The results are shown in Table 1.

As the data show, the use of sodium sulfite alone showed some slight improvement in brightness over the control. However, the brightness increased significantly when the sodium sulfite was used in combination with sodium carbonate. The optimum brightness was achieved in Example 8 with the addition of 3.5% sodium sulfite and 1.5% sodium carbonate.

For some recycled wastepaper mills, freeness is an important characteristic. The optimum freeness of the slurry was achieved in Example 9. However, in all cases, freeness was greater than that achieved by the control in Example 1, which typifies the current caustic soda technology.

TABLE 1

| Example No. | 1 | 2 | 3 | 4 | 5 | 6 | 7 | 8 | 9 |
|---|---|---|---|---|---|---|---|---|---|
| Chemical Treatment | Control | | | | | | | | |
| $Na_2SO_3$ | (NaOH only) | 1% | 3% | 5% | 0.7% | 1.4% | 2.1% | 3.5% | 5.0% |
| $Na_2CO_3$ | | — | — | — | 0.3% | 0.6% | 0.9% | 1.5% | 2.5% |
| pH after Disintegration | 9.6 | 7.5 | 7.9 | 7.7 | 8.3 | 9.8 | 9.0 | 9.6 | 9.9 |
| Temp. after Disintegration, °C. | 43 | 42 | 38 | 40 | 36 | 42 | 41 | 40 | 40 |
| % Consistency after Flotation | 0.82 | 0.81 | 0.88 | 0.82 | 0.86 | 0.85 | 0.84 | 0.77 | 0.76 |
| Freeness after Flotation, ml CSF | 99 | 121 | 126 | 118 | 123 | 116 | 105 | 132 | 146 |
| Brightness, ISO | | | | | | | | | |
| Wire Side | 54.0 | 53.8 | 54.5 | 54.4 | 54.9 | 54.4 | 55.8 | 57.3 | 55.8 |
| Felt Side | 54.7 | 54.9 | 55.5 | 55.8 | 55.9 | 56.6 | 57.4 | 58.0 | 57.1 |
| Reverted Brightness, ISO | | | | | | | | | |
| Wire Side | 53.3 | 53.1 | 53.9 | 53.9 | 54.1 | 53.8 | 55.0 | 56.6 | 55.1 |
| Felt Side | 54.2 | 54.3 | 54.9 | 55.2 | 55.3 | 56.0 | 55.3 | 57.5 | 56.4 |
| Opacity, % (Printer's) | | | | | | | | | |
| Wire Side | 98.7 | 97.6 | 98.3 | 98.6 | 98.1 | 98.2 | 97.8 | 98.3 | 97.7 |
| Felt Side | 98.7 | 98.6 | 97.3 | 98.3 | 98.1 | 97.5 | 97.8 | 98.2 | 97.3 |
| Sheffield Smoothness | | | | | | | | | |
| Wire Side | 299.6 | 287.2 | 291.4 | 258.0 | 278.8 | 278.6 | 282.6 | 272.2 | 280.2 |
| Felt Side | 360.6 | 356.2 | 338.8 | 347.6 | 330.4 | 353.2 | 347.2 | 346.8 | 348.0 |
| Tear Index, $mN*m^2/g$ | 9.13 | 8.15 | 7.97 | 7.65 | 7.97 | 8.09 | 7.89 | 8.49 | 7.99 |
| Burst Index, $kPa*m^2/g$ | 1.62 | 1.20 | 1.20 | 1.09 | 1.27 | 1.27 | 1.23 | 1.24 | 1.19 |
| Tensile Breaking Length, km | 3.398 | 3.084 | 3.011 | 2.801 | 3.133 | 3.146 | 3.129 | 2.945 | 3.033 |

As can be seen, this invention offers the advantage of deinking wastepaper stocks and achieving superior brightness characteristics, thereby eliminating completely or greatly reducing the need for additional bleaching. Compared to using caustic soda, this invention produces fibers with greater flexibility that achieves a slurry with higher freeness, resulting in a paper product with improved smoothness. The economic advantages are readily apparent from the elimination of, or the reduction of the use of, additional chemicals, and the operating and quality advantages gained.

It is therefore intended that the foregoing detailed description be regarded as illustrative rather than limiting, and that it be understood that it is the following claims, including all equivalents, which are intended to define the scope of the invention.

We claim:

1. A method of deinking printed wastepaper fibers comprising the steps of:
   disintegrating the wastepaper in an alkaline aqueous solution containing sodium sulfite and sodium carbonate with no other bleaching agents and no caustic alkalis added to form a fibrous slurry having a pH of at least about 7.5;
   separating the ink from the paper fibers in the slurry; and
   removing the separated ink from the slurry.

2. The method of claim 1 wherein the sodium sulfite and sodium carbonate are in a ratio between about 95 to 5 and about 50 to 50 by weight with respect to each other.

3. The method of claim 2 wherein the sodium sulfite and sodium carbonate are in a ratio between about 80 to 20 and about 60 to 40 by weight with respect to each other.

4. The method of claim 1 wherein at least about 0.7% by weight of dry paper charge of sodium sulfite and at least about 0.3% by weight of dry paper charge of sodium carbonate are added to the wastepaper.

5. The method of claim 4 wherein less than about 5% by weight of dry paper charge of sodium sulfite is added and less than about 2.5% by weight of dry paper charge of sodium carbonate is added.

6. The method of claim 5 wherein at least about 2% sodium sulfite and at least about 0.8% sodium carbonate is added.

7. The method of claim 6 wherein sodium sulfite is about 3.5 weight percent and sodium carbonate is about 1.5 weight percent.

8. The method of claim 1 wherein the pH of the slurry is between about 7.5 and about 10.5.

9. The method of claim 8 wherein the pH of the slurry is between about 8 and about 10.

10. The method of claim 9 wherein the pH of the slurry is between about 9 and 10.

11. The method of claim 1 wherein the disintegrating is carried out at a temperature between about 30° C and about 75° C.

12. The method of claim 1 further comprising adding a surfactant to aid in removing the displaced ink.

13. The method of claim 1 wherein sodium sulfite and sodium carbonate are added prior to disintegrating the wastepaper.

14. The method of claim 1 wherein the sodium sulfite and sodium carbonate are added with no other alkalis or deinking agents.

15. A method for deinking printed wastepaper comprising disintegrating the newsprint in an alkaline aqueous solution containing between about 0.7% and about 5% by weight of paper charge of sodium sulfite and between about 0.3% and about 2.5% by weight of paper charge of sodium carbonate with no other bleaching agents and no caustic alkalis added, to produce a slurry having a pH between about 7.5 and about 10.5, separating the ink from the paper fibers in the slurry and removing the separated ink from the slurry.

* * * * *